United States Patent
Robinson, III

(10) Patent No.: US 12,508,841 B2
(45) Date of Patent: Dec. 30, 2025

(54) NON-PNEUMATIC WHEEL

(71) Applicant: GM GLOBAL TECHNOLOGY OPERATIONS LLC, Detroit, MI (US)

(72) Inventor: William David Robinson, III, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 18/127,739

(22) Filed: Mar. 29, 2023

(65) Prior Publication Data

US 2024/0326515 A1 Oct. 3, 2024

(51) Int. Cl.
*B60C 7/00* (2006.01)
*B60B 21/02* (2006.01)
*B60B 25/00* (2006.01)
*B60C 7/10* (2006.01)

(52) U.S. Cl.
CPC .............. *B60C 7/10* (2013.01); *B60B 25/008* (2013.01); *B60B 21/02* (2013.01)

(58) Field of Classification Search
CPC ........... B60B 21/00; B60B 21/12; B60B 3/08; B60B 3/085; B60B 3/087; B60C 7/00; B60C 7/10
See application file for complete search history.

(56) References Cited

U.S. PATENT DOCUMENTS 4,162,713 A * 7/1979 Heitman ............. F16H 61/0262
180/242

FOREIGN PATENT DOCUMENTS

DE 102007006129 * 2/2010

* cited by examiner

*Primary Examiner* — Justin R Fischer

(57) ABSTRACT

A non-pneumatic wheel includes an outboard annular bead and an inboard annular bead axially spaced from the outboard annular bead. The inboard annular bead is connected to the outboard annular bead by a plurality of circumferentially spaced supports. The inboard annular bead includes a radially inwardly extending face having a plurality of mounting apertures.

17 Claims, 4 Drawing Sheets

NON-PNEUMATIC WHEEL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a non-pneumatic wheel and more particularly to a dust mitigating non-pneumatic wheel.

A typical pneumatic wheel includes a center disc with a plurality of lug nut openings, a plurality of spokes extending outward from the center disc and connected to an annular barrel portion with a pair of tire beads on opposite sides thereof. In the case of a pneumatic wheel, the annular barrel portion provides a tight seal with the tire and provides an enclosed space for inflating the tire. The present disclosure provides a non-pneumatic wheel that does not require an annular barrel portion between the two beads of the wheel and therefore allows for a significant weight reduction for each wheel.

SUMMARY

According to an aspect of the present disclosure, a non-pneumatic wheel includes an outboard annular bead and an inboard annular bead axially spaced from the outboard annular bead. The inboard annular bead is connected to the outboard annular bead by a plurality of circumferentially spaced supports. The inboard annular bead includes a radially inwardly extending face having a plurality of mounting apertures.

According to a further aspect, the radially inwardly extending face of the inboard annular bead includes a first center opening having a first diameter and the outboard annular bead includes a second center opening having a second diameter larger than the first diameter.

According to a further aspect, the first center opening is configured to receive an electric motor therein.

According to a further aspect, the inboard annular bead is connected to an electric motor.

According to a further aspect, the plurality of circumferentially spaced supports include between three and eight supports.

According to a further aspect, the plurality of circumferentially spaced supports include between three and eight rods.

According to a further aspect, a brake mechanism is connected to an inboard annular rim.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
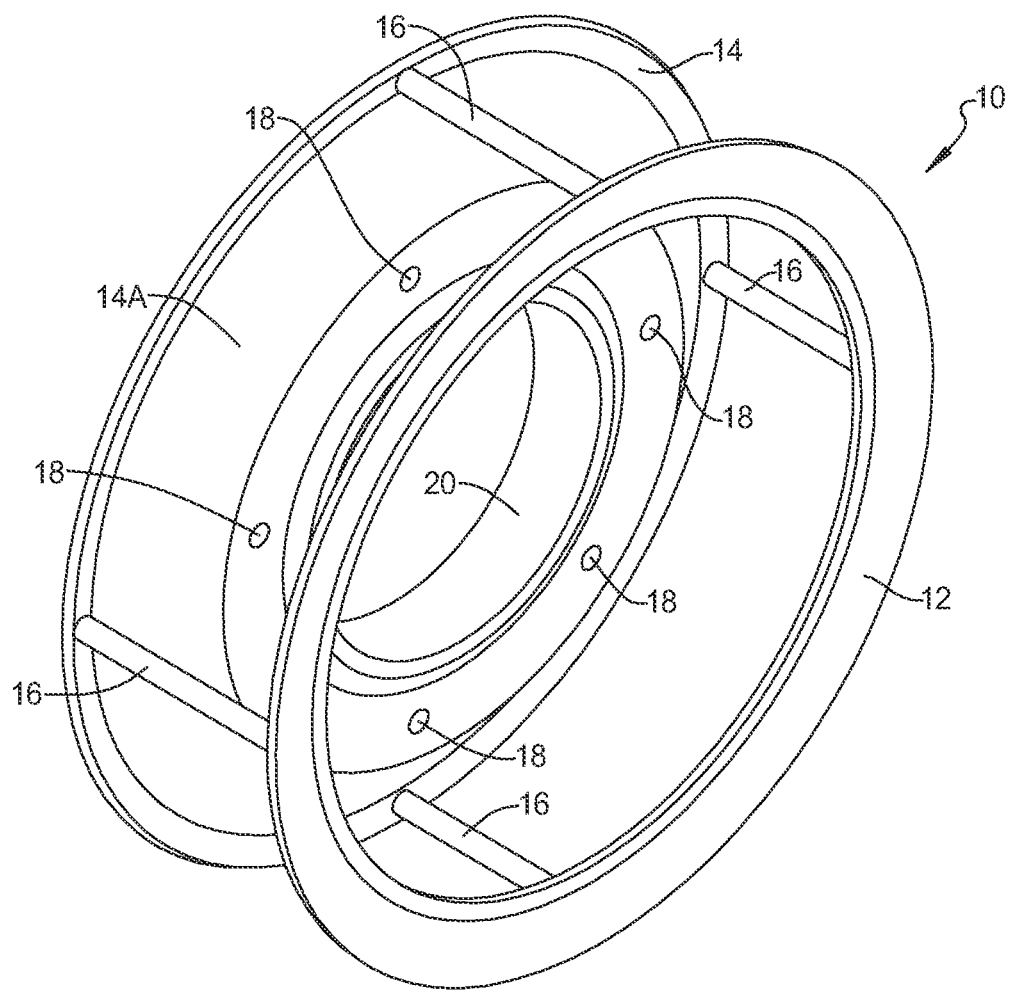
FIG. 1 is a perspective view of a non-pneumatic wheel according to the principles of the present disclosure.

With reference to FIG. 1, a non-pneumatic wheel 10 is shown including an outboard annular bead 12 and an inboard annular bead 14 axially spaced from the outboard annular bead 12. The inboard annular bead 14 is connected to the outboard annular bead 12 by a plurality of circumferentially spaced supports 16. The plurality of circumferentially spaced supports 16 can include between three and eight supports. The plurality of circumferentially spaced supports 16 can include a plurality of rods, although other types of supports 16 such as arms and beams can be used. The plurality of circumferentially spaced supports 16 can be welded, fastened or otherwise connected to the outboard bead 12 and the inboard bead 14.

The inboard annular bead 14 includes a radially inwardly extending face 14A having a plurality of mounting apertures 18 therein. The radially inwardly extending face 14A of the inboard annular bead 14 includes a first center opening 20 having a first diameter and the outboard annular bead 12 includes a second center opening 22 having a second diameter that can be larger than the first diameter. The first center opening 20 is configured to receive a portion of an electric motor therein. The radially inwardly extending face is configured to be mounted to a drive element of the electric motor.

Figure 2:
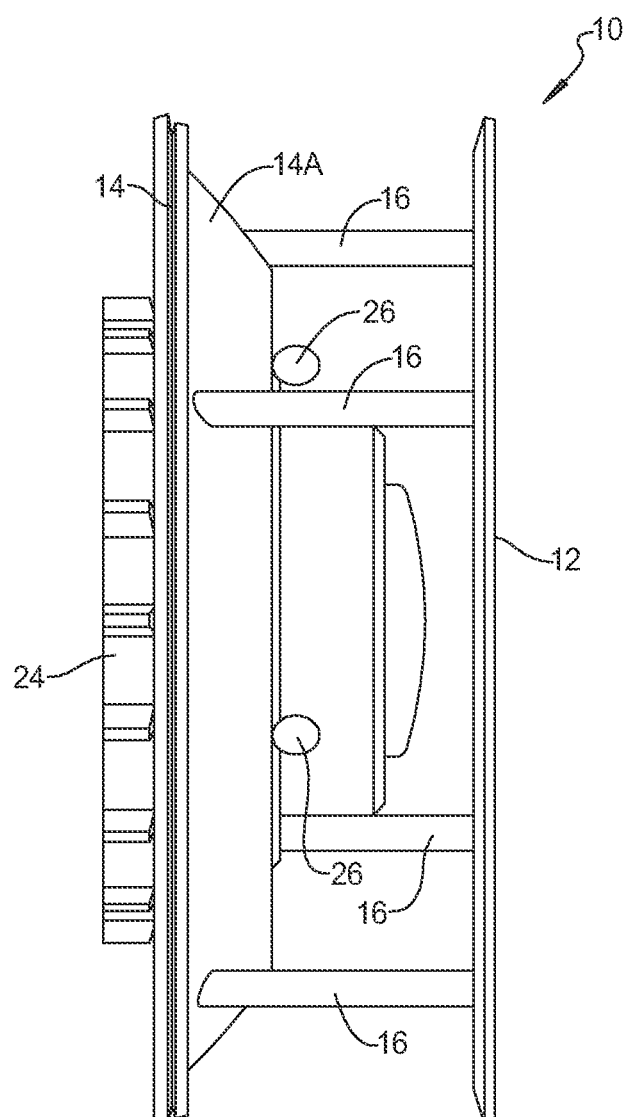
FIG. 2 is a front plan view of an electric motor connected to the non-pneumatic wheel.
Figure 3:
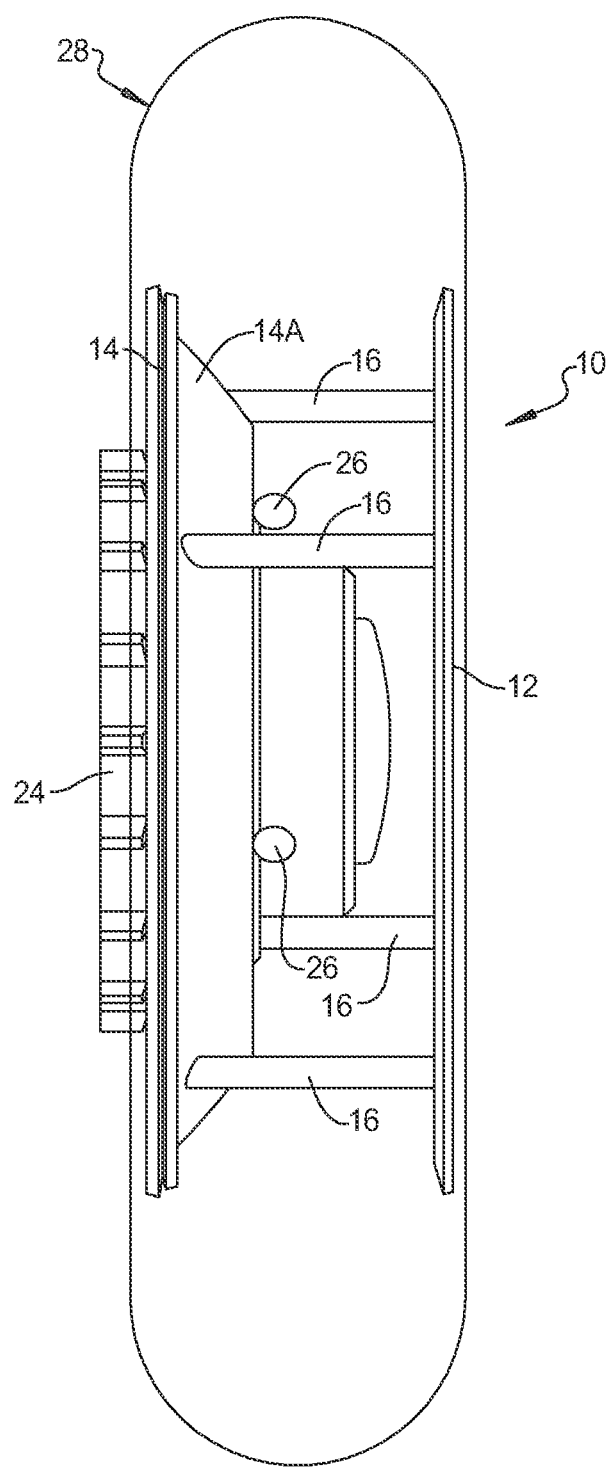
FIG. 3 is a front plan view of a brake mechanism connected to the non-pneumatic wheel.

With reference to FIGS. 2 and 3, an electric motor 24 is mounted to the inboard bead 14 by a plurality of wheel nuts 26 extending through the mounting apertures 18 in the face 14A with a portion of the electric motor 24 received in the first center opening 20 in the face 14A of the inboard bead 14. The non-pneumatic wheel 10 can be connected to a drive shaft of the electric motor 24. With continued reference to FIG. 3, a non-pneumatic tire 28 is shown mounted to the outboard bead 12 and the inboard bead 14.

Figure 4:
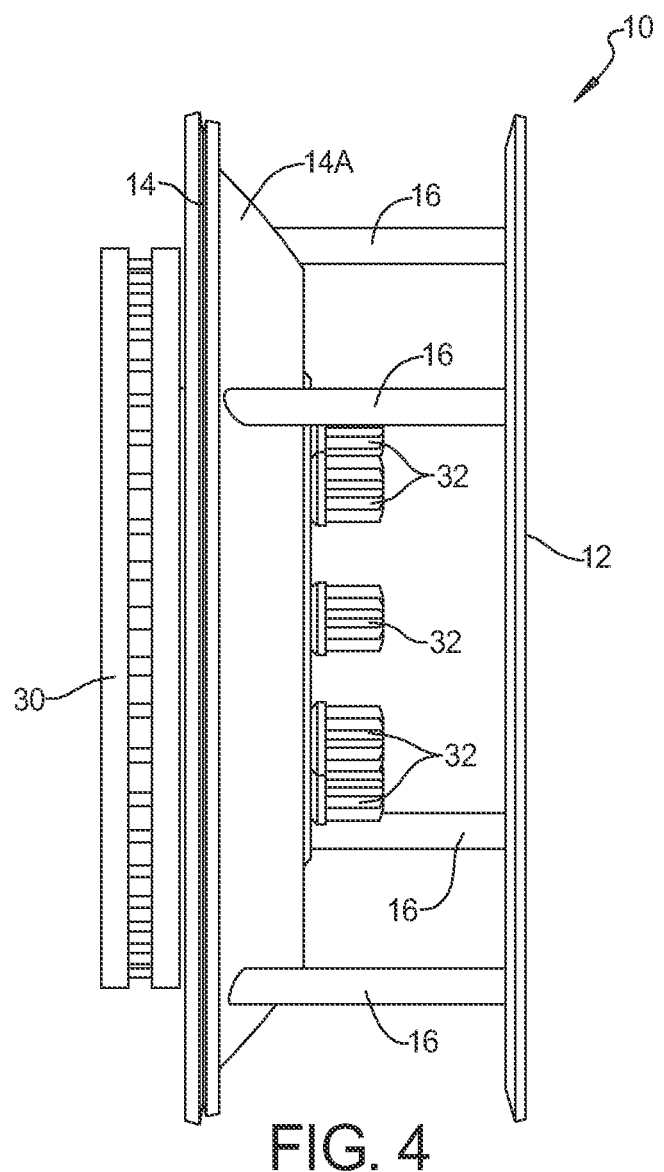
FIG. 4 is a partial cutaway front plan view of a non-pneumatic tire and an electric motor mounted to the non-pneumatic wheel.

With reference to FIG. 4, a brake component 30 is shown mounted to the inboard bead 14 by a plurality of wheel nuts 32 extending through openings in the face 14A. The brake component 30 can be part of a disk or drum brake assembly.

The non-pneumatic wheel 10 can be made from aluminum, steel, other engineering materials and combinations thereof. The present disclosure provides a non-pneumatic wheel 10 that does not require an annular barrel portion between the two beads 12, 14 of the wheel and therefore allows for a significant weight reduction for each wheel. The radially extending face portion 14A protects critical components, while the supports 16 connect the outboard bead 12 to the inboard bead to reduce the weight of the wheel 10. The non-pneumatic tire 28 can be of any known type.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A non-pneumatic wheel, comprising:
an outboard annular bead; and
an inboard annular bead axially spaced from the outboard annular bead, the inboard annular bead connected to the outboard annular bead by a plurality of circumferentially spaced supports, the inboard annular bead including a radially inwardly extending face having a plurality of mounting apertures, wherein the radially inwardly extending face of the inboard annular bead includes a first center opening having a first diameter and the outboard annular bead includes a second center opening having a second diameter larger than the first diameter.

2. The non-pneumatic wheel according to claim 1, wherein the first center opening is configured to receive an electric motor therein.

3. The non-pneumatic wheel according to claim 1, wherein the inboard annular bead is connected to an electric motor.

4. The non-pneumatic wheel according to claim 1, wherein the plurality of circumferentially spaced supports include between three and eight supports.

5. The non-pneumatic wheel according to claim 1, wherein the plurality of circumferentially spaced supports include between three and eight rods.

6. The non-pneumatic wheel according to claim 1, further comprising a brake mechanism connected to the inboard annular bead.

7. A non-pneumatic wheel, comprising:
an outboard annular bead;
an inboard annular bead axially spaced from the outboard annular bead, the inboard annular bead connected to the outboard annular bead by a plurality of circumferentially spaced supports, the inboard annular bead including a radially inwardly extending face having a plurality of mounting apertures, wherein the radially inwardly extending face of the inboard annular bead includes a first center opening having a first diameter and the outboard annular bead includes a second center opening having a second diameter larger than the first diameter; and
a non-pneumatic tire mounted to the outboard annular bead and the inboard annular bead.

8. The non-pneumatic wheel according to claim 7, wherein the first center opening is configured to receive an electric motor therein.

9. The non-pneumatic wheel according to claim 7, wherein the inboard annular bead is connected to an electric motor.

10. The non-pneumatic wheel according to claim 7, wherein the plurality of circumferentially spaced supports include between three and eight supports.

11. The non-pneumatic wheel according to claim 7, wherein the plurality of circumferentially spaced supports include between three and eight rods.

12. The non-pneumatic wheel according to claim 7, further comprising a brake mechanism connected to the inboard annular bead.

13. A non-pneumatic wheel, comprising:
an outboard annular bead;
an inboard annular bead axially spaced from the outboard annular bead, the inboard annular bead connected to the outboard annular bead by a plurality of circumferentially spaced supports, the inboard annular bead including a radially inwardly extending face having a plurality of mounting apertures, wherein the radially inwardly extending face of the inboard annular bead includes a first center opening having a first diameter and the outboard annular bead includes a second center opening having a second diameter larger than the first diameter;
a non-pneumatic tire mounted to the outboard annular bead and the inboard annular bead; and
an electric motor connected to the inboard annular bead.

14. The non-pneumatic wheel according to claim 13, wherein the first center opening is configured to receive the electric motor therein.

15. The non-pneumatic wheel according to claim 13, wherein the inboard annular bead is connected to an electric motor.

16. The non-pneumatic wheel according to claim 13, wherein the plurality of circumferentially spaced supports include between three and eight supports.

17. The non-pneumatic wheel according to claim 13, wherein the plurality of circumferentially spaced supports include between three and eight rods.

\* \* \* \* \*